United States Patent [19]
Rashkov et al.

[11] 4,097,660
[45] Jun. 27, 1978

[54] HETEROGENEOUS ANIONIC POLYMERIZATION PROCESS

[75] Inventors: Ilia Rashkov, Sofia, Bulgaria; Jean Golé, Thurins, France; Daniel Guérard, Malzeville, France; Albert Herold, Laxou, France; Gérard Merle, Oullins, France; Ivan Martinov Panayotov, Sofia, Bulgaria; Jean-Pierre Pascault, Villeurbanne, France; Quang Tho Pham, Caluire, France; Christian Pillot, Caluire, France; Robert Salle, Lyons, France

[73] Assignee: Agence Nationale de Valorisation de la Recherche (ANVAR), France

[21] Appl. No.: 793,551

[22] Filed: May 4, 1977

Related U.S. Application Data

[62] Division of Ser. No. 695,837, Jun. 14, 1976, Pat. No. 4,035,562.

[30] Foreign Application Priority Data

Jun. 14, 1975 Bulgaria .................................. 30292

[51] Int. Cl.² ........................... C08F 4/02; C08F 4/08; C08F 36/06; C08F 36/08

[52] U.S. Cl. .................................. 526/173; 526/335; 526/340; 526/913; 252/447

[58] Field of Search ............................................ 526/173

[56] References Cited

U.S. PATENT DOCUMENTS

| 2,965,624 | 12/1960 | Anderson | 526/173 |
| 3,479,300 | 11/1969 | Rivin et al. | 526/173 |
| 4,035,562 | 7/1977 | Rashkov et al. | 526/173 |

FOREIGN PATENT DOCUMENTS 1,402,947  12/1965  France.

Primary Examiner—William F. Hamrock
Attorney, Agent, or Firm—Lee C. Robinson, Jr.

[57] ABSTRACT

The present invention relates to a heterogeneous anionic polymerization process, catalyzed by a metallic insertion graphitic compound. According to the invention, the alkaline metal chosen for the insertion compound is lithium, and the insertion compounds are of binary or ternary type; in the latter case, the insertion compound may comprise an aromatic hydrocarbon also inserted within the graphitic structure. The invention relates in particular to the homopolymerization of butadiene or isoprene, and to the copolymerization of isoprene-styrene.

5 Claims, No Drawings

HETEROGENEOUS ANIONIC POLYMERIZATION PROCESS

This is a division, of application Ser. No. 695,837 filed Jun. 14, 1976, now U.S. Pat. No. 4,035,562.

The present invention relates, on the one hand, to a heterogeneous anionic polymerization process, catalyzed by a metallic insertion graphitic compound, and on the other hand, to the polymers obtained by means of this process.

By polymerization in the context of the present invention, is meant both a homopolymerization of one and the same monomer and a copolymerization of a monomer and of at least one comonomer, copolymerizable with one another. In the first case, the polymerization product is called homopolymer and, in the second case, copolymer.

In U.S. Pat. No. 2,965,624 of Dec. 20, 1960, a heterogeneous anionic polymerization process had already been proposed for the manufacture of synthetic rubbers, meeting, in general, the following definitions.

In order to carry out the anionic polymerization in a heterogeneous phase, an appropriate reaction medium is prepared, comprising:

- a hydrocarbon solvent; namely, either a saturated aliphatic solvent, for example, hexane; or an aromatic solvent, for example, benzene; or a saturated alicyclic solvent, for example, cyclohexane;
- at least one monomer, dissolved in the aforementioned solvent, with a conjugated dienic structure, for example, 1-3 butadiene or isoprene;
- at least one catalyst, in suspension in the aforementioned solvent, consisting of a binary metal insertion compound, comprising a carbon with a graphitic structure, for example a graphite, and at least one element inserted in the aforementioned graphitic structure, namely, an alkaline metal.

The alkaline metals, as stated in the aforementioned United States patent as being capable of forming binary insertion compounds with the graphitic structure, were solely sodium, potassium, rubidium, cesium, and not lithium. For, in fact, until recently, as will be shown later, no physical method was known enabling binary insertion compounds to be obtained with lithium.

In French Pat. No. 1.228.027, issued on Mar. 14, 1960, a heterogenous anionic polymerization process is described which is similar to the process described previously. Although the metals considered, in this French patent, as being capable of forming binary insertion compounds with a graphitic structure, were generally described as belonging to the alkaline metal group, only the use of potassium was described by way of an example to obtain the designs of binary insertion compounds. In fact, for the same reasons as those mentioned previously, at the time of the filing of the French patent under consideration, it was physically impossible to obtain binary insertions with lithium.

The different processes for obtaining binary insertion compounds with an alkaline metal, with the exception of lithium, were fully described in the following document:

(1) Paper by Albert Herold in the "Bulletin de Société Chimique de France" of 1955, page 999.

In addition, in French Pat. No. 1.402.947, issued on May 10, 1965, a process was described for obtaining binary insertion compounds, in particular, based on lithium. This process consists, first, in obtaining in a polar solvent, for example, tetrahydrofuran, an addition compound of the chosen alkaline metal, for example, lithium, and a polynuclear aromatic hydrocarbon, for example, naphtalene, and second, in making the solution of the addition compound obtained act on the chosen carbon with the graphitic structure, for example, graphite.

Although in the specification of French Pat. No. 1.402.947, the claim is made that the process described enables binary insertions to be obtained, in particular, the graphite/lithium binary insertion compounds, careful crystallographic and thermogravimetric studies have demonstrated, since then, that the insertion compounds obtained were, in fact, ternary and not binary compounds and could be defined as comprising, essentially:

- the carbon with the chosen graphitic structure, for example, a graphite;
- the chosen alkaline metal, for example, lithium, inserted in the crystal lattice of the graphitic carbon,
- the chosen polar solvent, having served for the preparation of the aforementioned addition compound, also inserted in the crystal lattice of the graphitic carbon; generally, the alkaline metal remains bound to the polar solvent between the graphitic planes of the chosen carbon.

In other words, according to French Pat. No. 1.402.947, graphitic carbon/alkaline metal/polar solvant ternary insertions are obtained and not graphitic carbon/alkaline metal binary insertions. Such a correction of the interpretation of the results was, in fact, made by the applicant of the aforementioned French patent, in the description of Example 1 in the French Certificate of Addition published under No. 2.067.543.

The process described in French Pat. No. 1.402.947 thus constitutes a means of obtaining the aforementioned ternary insertions with a polar solvent. This means, moreover, has been studied and described more completely in the following documents:

(2) Paper by C. Stein, L. Bonnetain, J. Golé, in the "Bulletin de la Societe Chimique de France", 1966, page 3166;

(3) Paper by M. Rose, M. Prost, J. Golé, in the "Comptes Rendus de l'Académie des Sciences de Paris", 1967, volume 265 C, page 616;

(4) Paper by Co-Minh Duc, J. Golé, in the "Journal de Chimie Physique", 1972, volume 6, page 986.

Regarding the possibilities of obtaining graphitic carbon/alkaline metal/aromatic hydrocarbon ternary insertion compounds, these are considered, theoretically, in the following paper and have, so far, not been confirmed experimentally:

(5) Paper by I. B. Rashkov, I. M. Panayotov, N. N. Tyutyulkov, in the "Bulletin de la Société Chimique de France", 1975, volumes 5-6, page 1271.

In conclusion, up to a relatively recent date, the previous art, detailed previously, can be summarized as follows:

(1) all the graphitic carbon/alkaline metal binary insertion compounds are known, with the exception of those involving lithium, (2) only the graphitic carbon/alkaline metal (including lithium)/polar solvent ternary insertion compounds had been obtained experimentally, with the exception of those including an aromatic hydrocarbon.

These conclusions have been modified by the fact that graphitic carbon/lithium binary insertion compounds are recently obtained, using the technique described in the following document:

(6) Paper by D. Guérard and A. Herold, in the "Comptes Rendus de l'Académie des Sciences de Paris", 1972, volume 275 C, page 571.

From then it became interesting in regard to the heterogeneous anionic polymerization of a conjugated diene monomer:

(1) to test out these new graphitic carbon/lithium binary insertion compounds as catalysts,
(2) endeavour, with these new compounds, to obtain graphitic carbon/lithium/aromatic hydrocarbon ternary insertions, and try out the latter as catalysts or, in case of failure, the corresponding aromatic hydrocarbon plus graphitic carbon/lithium binary insertion mixtures.

Thus, in general, the present invention consists of a heterogeneous anionic polymerization process, according to which a reaction medium is formed, comprising at least one monomer having a diene structure, at least one catalyst comprising a carbon with a graphitic structure and at least one element inserted in this latter, namely lithium, chosen as the alkaline metal.

This process then enabled a surprising observation to be made.

In general, by choosing lithium as the alkaline metal of the catalyst, in particular, choosing as a catalyst a graphitic carbon/lithium binary insertion compound, for example, a graphite/lithium binary insertion compound, the microstructures of the homopolymers and copolymers obtained are not fundamentally different from those obtained by other anionic polymerization methods, notably in a homogeneous phase with a catalyst such as n-butyl-lithium.

This constitutes a surprising result, on account of the following scientific reasoning:

(1) it is reasonable to believe that the catalytic action of the graphitic insertion compounds is linked to their capacities of penetrating a monomer, and possibly a comonomer, within the interior of the graphitic planes of these compounds; the greater the spacing between the aforementioned planes, the easier it is for the monomers to gain access to the active sites of the insertion compounds and the more likely it is for the macromolecular chains to grow normally, and conversely,
(2) the spacing between the graphitic planes depends on the atomic radius of the insertion metal; the smaller the latter, the smaller is the spacing between the graphitic planes, and conversely,
(3) since the lithium has a relatively small atomic radius, compared with the atomic radii of the other alkaline metals, this should give the monomer, and possibly the comonomer, difficulty in penetrating the interior of the graphitic planes of the insertion compound, and thus difficulties in regards to the growth of the macromolecular chains; but, as is shown experimentally later, it has been found that this is not the case, providing the appropriate operating conditions are chosen.

In particular, when the reaction medium, according to the invention, includes an aromatic hydrocarbon, with which the diene monomer is also brought into contact, macromolecular microstructures are, generally, obtained, these being very similar to those obtained when other anionic polymerization methods are used, in particular, in the homogeneous phase with a catalyst such as n-butyl-lithium.

This is an equally surprising result, for the same scientific reasons that were given previously.

In addition, still in regard to an aromatic hydrocarbon and a graphitic carbon/lithium binary insertion compound, in most cases it has been found that a ternary insertion compound is obtained "in situ" inside the reaction medium and comprising:

the carbon with a graphitic structure, for example graphite,
the lithium inserted in the graphitic structure,
and the aromatic hydrocarbon, also inserted in the graphitic structure, and that this ternary insertion constituted, in fact, the polymerization catalyst.

The existence of such a ternary insertion compound, inside the reaction medium, no doubt explains the results that have been obtained and described previously. Moreover, mention can be made of similar results when, instead of obtaining the aforementioned ternary insertion compound "in situ", this latter was obtained independently of the polymerization reaction medium, by bringing the corresponding binary compound into contact with an aromatic hydrocarbon, according to the method suggested, theoretically, in paper (5), followed by the introduction of the binary compound thus obtained into the reaction medium.

For it is possible to prepare a ternary insertion compound under consideration by bringing the corresponding binary insertion compound into contact with a solution of the insertion hydrocarbon in an aliphatic solvent, at a temperature of −20° C to plus 120° C, preferably between 5° C and 60° C, for 1 to 30 days, stirring continually.

The aromatic hydrocarbon and the solvent must be carefully purified, so as to avoid any trace of humidity or of a proton donor compound. This is effected under vacuum or in an inert atmosphere. The new compounds thus obtained are purified by filtration under vacuum or in an inert atmosphere.

On the other hand, it has been found, with surprise, that when homopolymerization of 1-3 butadiene or isoprene is carried out under the operating conditions previously described, homopolymers are obtained, mostly with 1-4 chains, which gives the product obtained a relatively low vitreous transition point and good elastomeric properties.

In addition, by copolymerizing isoprene (diene monomer) with styrene (α-olefine comonomer, copolymerizable with the diene monomer) it is found, surprisingly, that statistical copolymers are obtained, having a structure which is very close to an alternating structure, whereas it could be expected that sequential copolymers would be obtained.

This is a basic result, so far as the statistical styrene-isoprene copolymers, marketed under the name of SBR or GRS, are at present obtained commercially in emulsion form by the radical method, or experimentally in solution by the anionic method. The process, according to this invention, therefore, opens up a new way of obtaining the aforementioned copolymers, namely, anionic copolymerization in a heterogeneous phase, with all the advantages that this implies, that is principally, the fact that contrary to that which is the case in the anionic polymerization processes in a homogeneous phase that were previously mentioned, the 1-4 cis microstructure of the diene is not disturbed substantially.

In addition, the styrene-isoprene copolymers obtained in accordance with the invention, have a much lower vitreous transition point and far better elastomeric properties than that and those of the styrene-isoprenes obtained at present in emulsion form using radicals. Thus, a styrene-isoprene copolymer prepared according to the invention, comprising a molar styrene chain percentage of 41%, has a vitreous transition point of $-43°$ C, whereas a copolymer of identical composition, prepared in emulsion form with radicals, has a vitreous transition point of $-6°$ C.

In short, therefore, it can be stated that the process, according to this invention, enables numerous presently known polymers and copolymers to be obtained by means of a preparatory method, namely, an anionic method in heterogeneous phase, which is totally different from the preparatory methods at present used in industry.

In addition, this invention also comprises the following secondary characteristics:

(1) when a graphitic carbon/lithium binary insertion compound is used, the preferred compound is a binary graphite/lithium compound with an empirical formula of $LiC_{6n}$, with $1 \leq n \leq 6$; the empirical formula of such a compound can be determined by flame photometry and/or thermogravimetric analysis, (2) the polymerization can equally well be carried out in a liquid or gaseous phase; it can also be mass polymerization, (3) when polymerization takes place in a liquid phase, the reaction medium comprises, for example, a solvent in which the monomer has been dissolved and in which the catalyst is in suspension; this solvant is, in particular, chosen among the following hydrocarbon solvents, that is, a a straight or branched chain saturated aliphatic solvent, and a saturated alicyclic solvent, (4) when polymerization takes place in solution and the reaction medium includes an aromatic hydrocarbon, one can use the latter as a solvent or dissolve the aromatic hydrocarbon in the solvent used, if the aforementioned hydrocarbon is a solid substance.

The aromatic insertion hydrocarbons that can be used, in accordance with the present invention, can be classified as follows:

benzene and mono-, di-, tri, and polyalcoyl- benzenes with straight and branched chains, such as toluene, xylene, ethylbenzene, isobutylbenzene, etc., benzenes with an alcoylene substitute such as α-methylstyrene 1—1 diphenylethylene, aromatic hydrocarbons such as biphenyl, triphenyl, polynuclear aromatic hydrocarbons, such as naphtalene, anthracene, phenylnaphtalene, etc.

The carbons with a graphitic or lamellar structure which can be used, according to the present invention, all have a crystal lattice similar to, or identical with, that of graphite, well known to the experts. In this connection, by way of example, the following substances can be cited: graphite, certain graphitic carbon blacks, in particular those used for loading rubber, lamp black, pyrographite, activated carbons, etc.

Still, according to this invention, when a saturated aliphatic or alicyclic solvent is used, in general, it includes 5 to 10 carbon atoms. In this connection, by way of example, the following compounds can be cited: pentane, cyclopentane, hexane, cyclohexane, heptane, isopentane, 2,2,4 isohexane, trimethylpentane, decane, methylcyclohexane, and iso-octane.

In accordance with this invention, at least one of the monomers participating in the polymerization reaction has a conjugated diene structure. These monomers do not include any substituents which could hinder polymerization, for example, polar groups and, in particular, alkoxy groups. The following compounds can be cited in this connection:

1, 3 butadiene, isoprene, 2, 3 dimethyl 1, 3 butadiene, 2 methyl 1, 3 pentadiene, piperylene, 2, 3 dimethyl 1, 3 pentadiene, 2 methyl 3 ethyl 1, 3 pentadiene, 2 phenyl 1, 3 butadiene, 2, 3 diethyl 1, 3 octadiene.

In accordance with the present invention, the chosen comonomers, copolymerizable with the monomers, can be, in particular, α-olefines such as styrene and various other alcoyl styrenes.

In the manner known, the polymers obtained, according to this invention, can be loaded, vulcanized, and treated like natural rubbers.

The process, according to this invention, has been tested under the following operating conditions.

First, the monomers and solvents were purified according to the conventional methods used in anionic polymerization, and described, for example, in the following documents:

(7) Paper by I. M. Panayotov and I. B. Rashkov, in the "Journal of Polymer Science", 1972, Part A1, Volume 10, page 1276, (8) Paper by I. M. Panayotov and I. B. Rashkov, in the "Journal of Polymer Science", 1973, Part A1, Volume 11, page 2615, (9) Paper by I. M. Panayotov and I. B. Rashkov, in the journal "Makromolecular Chemie", 1975, Volume 175, page 3305,

(10) Paper by A. Essel, Q. T. Pham and J. Golé in the "Journal of Polymer Science", 1973, Part A1, Volume 11, page 1851.

Second, the binary insertion compounds of lithium were prepared in accordance to the method described in publication (6), from ground Madagascar graphite; the binary insertion compounds generally obtained corresponded to the empirical formula $LiC_{12}$. Samples of the catalyst thus prepared were weighed and packed under vacuum.

Third, all of the polymerizations, whether homopolymerizations or copolymerizations were concerned, were carried out under the conventional, anionic polymerization conditions, that is, in the absence of air and any humidity and in an inert atmosphere. Such experimental conditions were, for example, given in detail in U.S. Pat. No. 2,695,624, and French Pat. No. 1.228.027. Moreover, these polymerizations were carried out in glass reactors, provided with fragile joints and sealed under high vacuum. In general, the solvent chosen (80 ml) was introduced first into the reactor, then the catalyst, and immediately afterwards the chosen monomer (5 ml). The polymerization temperature, in general, lay between $-80°$ C and $+30°$ C, and variations of the latter enabled the microstructure of the polymers obtained to be modified.

Fourth, a high resolution NMR analysis was made of the configurations of the polymers obtained with the aid of a VARIAN DA 60 IL spectrometer operating at 60 MHz. The polymers obtained were dissolved in deuterium benzene. The method of analysis was that described in the following document:

(11) Paper by Q. T. Pham, in "Polymers Letters", 1970, Volume 8, pages 723-729.

Fifth, the analysis of the molecular masses of the polymers obtained was made with the aid of chromatography on a permeable gel, with a set of five columns of silica marbles known under the name of "Spherosil" with the references, respectively, of X OA 200, X OB 75, X OB 30, X OA 400 and X OC 005. The elution solvent chosen was tetrahydrofuran, circulating in the aforementioned columns at 25° C at a rate of 1 ml per minute. Polystyrenes of known molecular mass were used for calibration purposes. The molecular masses of the polymers obtained were calculated with the aid of the following equation: $\log [n] M = 1.693 \log V_e - 1.41$, taking the Benoit and Grubisic universal standard as a base, $[n]$ being the intrinsic viscosity of the polymer, M the mean molecular mass in number, and $V_e$ the elution volume. In this connection, reference should be made to the following documents:

(12) Paper by H. Benoît, Z. Grubisic, P. Rempp, D. Decker, and J. G. Zilliox published in the "Journal de Chimie Physique", 1966, Volume 63, page 1507,

(13) Paper by Z. Grubisic, P. Rempp, H. Benoît, published in the "Journal of Polymer Science", 1967, Volume B5, page 753.

Sixth, the vitreous transition points were obtained by differential thermal analysis with the aid of a DU PONT thermal microanalyser, provided with a DSC cell and a temperature rise rate of 10° C per minute.

Tables 1, 2, and 3 refer, respectively, to the polymerization of butadiene (5cm3 of monomer in 80cm3 of solvent), the polymerization of isoprene (5cm3 of monomer in 80cm3 of solvent), and the copolymerization of isoprene and styrene. Table 4 shows the influence of the quantity of the catalyst $C_{12}Li$ on the polymerization time of isoprene.

Table 1

| Catalyst | Solvent | Polymerization time in hours | Weight of graphite of binary insertion compound introduced into the reactor, in g | Polymerization yield | $\overline{M_n}$ | $\dfrac{\overline{M_w}}{\overline{M_n}} = I$ | Microstructure configurations | | Vitreous transition point in ° C |
|---|---|---|---|---|---|---|---|---|---|
| | | | | | | | 1-4 | 1-2 | |
| Binary insertion compound with an empirical formula of Li $C_{12}$ n butyl-lithium in homogeneous phase | cyclohexane | 42 | 0.0669 | 15.4 | 240 900 | 1.22 | 55 | 45 | −26 |
| | cyclohexane | 100 | 0.0994 | 51.3 | | | 90 | 10 | −96 |
| | toluene | 100 | 0.1024 | 21.5 | | | 88 cis | 12 trans | −95 |
| | cyclohexane | (14) Paper by C.A. Vranek, in the "Journal of Polymer Science", 1971, Part A1, Volume 9, page 2273. | | | | | 42.8 | 52.2 5.0 | |

$\overline{M_n}$ mean molecular mass in number
$\overline{M_w}$ mean molecular mass in weight
I polymolecularity index Table 2

| Catalyst | Solvent | Polymerization time in hours | Weight of graphite of binary insertion compound introduced into the reactor, in g | Polymerization yield | $\overline{R_n}$ | $\dfrac{\overline{R_w}}{\overline{R_n}}$ | Microstructure | | | | Vitreous transition point in ° C |
|---|---|---|---|---|---|---|---|---|---|---|---|
| | | | | | | | 1-4 cis | 1-4 trans | 1-2 | 3-4 | |
| Binary insertion compound with an empirical formula of Li $C_{12}$ lithium in homogeneous phase | cyclohexane | 168 | 0.0318 | 80.0 | 240 | 1.80 | 44 | 35 | 0 | 21 | −53 |
| | toluene | 66 | 0.0505 | 53.0 | 117 | 2.88 | 64 | 27 | 0 | 9 | −64 |
| | cyclohexane | (15) Paper by A. Essel, R. Salle, J. gole, in the "Journal of Polymer Science", 1975, Part A1, Volume 13, page 1853 | | | | | 73 | 22 | 0 | 5 | |
| potassium in neous phase | benzene | | | | | | 62 | 30 | 0 | 8 | |
| | cyclohexane | Publication (15) | | | | | 22 | 37 | 5 | 36 | −41 |

$\overline{R_n}$ Radius of mean rotation in number
$\overline{R_w}$ Radius of mean rotation in weight Table 3

| | Experimental Conditions | | | | Results | | | | |
|---|---|---|---|---|---|---|---|---|---|
| No. | Initial percentage of styrene in moles | Introduction of styrene | Polymerization time in hours | Weight of graphite of the binary insertion compound introduced into the reactor, in g | Percentage of styrene chains in moles | Total yield as percentage | Yield with respect to styrene as percentage | Yield with respect to isoprene as percentage | Vitreous transition point in ° C |
| 1 | 46.6 | with isoprene | 66 | 0.1908 | 41 | 51 | 43.4 | 59.2 | −43 |

Table 3-continued

| | Experimental Conditions | | | | Results | | | | |
|---|---|---|---|---|---|---|---|---|---|
| No. | Initial percentage of styrene in moles | Introduction of styrene | Polymerization time in hours | Weight of graphite of the binary insertion compound introduced into the reactor, in g | Percentage of styrene chains in moles | Total yield as percentage | Yield with respect to styrene as percentage | Yield with respect to isoprene as percentage | Vitreous transition point in °C |
| 2 | 34.3 | 15 hours before isoprene | 116 | 0.1496 | 11.5 | 45 | 15.9 | 67 | −52 |

Note: Tests No. 1 and 2 were made with:
- a total concentration of monomer and of comonomer of the order of 10% with respect to the solvent,
- a ratio of isoprene to styrene of the order of 1/1.

Table 4

| Solvent | Weight of graphite in g | Reaction time in h | Yield |
|---|---|---|---|
| cyclohexane | 0.032 | 168 | 80.0 |
| | 0.149 | 24 | 82.0 |
| toluene | 0.0505 | 66 | 53.0 |
| benzene | 0.129 | 26 | 66.0 |

The experimental results reported in Tables 1 to 4, can be discussed in the following way.

First, as regards the conjugated dienes (see Tables 1 and 2), that is, butadiene and isoprene, it is seen, surprisingly, that the microstructures obtained are not fundamentally different from those obtained in the homogeneous phase by anionic polymerization.

Second, still in the case of conjugated dienes (see Tables 1 and 2), it is found, surprisingly, that the polymers obtained have a majority of 1–4 chains, with a relatively low vitreous transition point, which gives these polymers good elastomeric properties.

Third, still in the case of conjugated dienes (see Tables 1 and 2), it is seen, surprisingly, that, if the results obtained in a saturated alicyclic solvent (cyclohexane) and in an aromatic solvent (toluene) are compared for the same monomer, a much larger number of 1–4 chains is obtained and, consequently, the structure tends to be much closer to that of the natural rubbers, when the solvent is of the aromatic type rather than of the saturated type.

This effect can be attributed a posteriori in the case of an aromatic solvent to the existence of a ternary graphite/lithium/solvent insertion compound. The existence such compounds can be checked by allowing the graphite-lithium binary insertion compound only to act on the solvent and making X-ray diffraction pictures from samples of the insertion compounds thus modified, for example with a copper or cobalt anti-cathode. If these pictures are compared with the diffraction pictures of the binary compound taken initially, it is seen that newer diffraction lines have appeared, showing that the structure of the initial insertion compound has changed. Moreover, by an elementary analysis of the modified insertion compound, it can be shown that the empirical formula of the starting insertion compound has, in fact, changed.

But, the insertion of an aromatic solvent into the interior of the crystal lattice of the graphite leads to an increase in the distance between the graphitic planes. This, a posteriori, can then explain the results obtained in the case of the dienes dissolved in an aromatic solvant; for, the monomers can then penetrate the interior of the graphitic structure more easily.

Fourth, still in regard to conjugated dienes, by examining the chromatographic patterns with permeable gel of the polymers obtained, that is, by examining the poly-dispersity curves of these latter, it is seen, surprisingly, that the distribution of the molecular masses of the polymers prepared according to the invention is relatively narrow, by comparison with the results obtained generally in heterogeneous catalysis polymerizations.

Fifth, still in regard to the conjugated dienes, it is seen, by examining Table 4, that when the quantity of catalyst increases, the reaction time to obtain an equivalent, or even greater yield, diminishes.

Sixth, in the case of the styrene-isoprene copolymerization (see Table 3) it is seen, surprisingly, that statistical copolymers are obtained, very near to alternations, in accordance with the following observations:

(a) the polymerization yields, with respect to styrene and isoprene are comparable, which indicates an alternation of the polymer obtained, (b) the copolymers obtained have only one vitreous transition point; they are, therefore, not sequential copolymers, (c) NMR analysis, with 128 spectrum accumulations, shows a single, very fine, resonance band for the protons $(p + m + o)$ of the aromatic nucleus of styrene; this proves that the mean length of the styrene sequences is very small and always below 5 (from 5 onward, an $o$ proton peak begins to appear in the NMR spectrum), (d) in addition, the higher percentage of styrene in the macromolecular chain indicates a tendency toward alternation of the isoprene and styrene patterns; this is confirmed by the abnormally low transition point of the polymer that is obtained, with respect to a same percentage of styrene; for it is known that the existence of an alternating structure diminishes the interactions between the styrene units in the same chain and increases flexibility.

This result is surprising insofar that it is known that in a homogeneous phase and in a non-polar medium, isoprene polymerizes preferentially with respect to styrene, so that under these conditions sequential copolymers can only be obtained.

What we claim is:

1. A heterogeneous anionic polymerization process, wherein a reaction medium is formed and comprises firstly at least one monomer having a conjugated diene structure, secondly at least one catalyst comprising a carbon with a graphitic structure and at least one element inserted in the latter, that is lithium, and thirdly at least a solvent chosen from the following hydrocarbon solvents, a saturated aliphatic solvent with a straight or branched chain, and a saturated alicyclic solvent, in which the monomer is dissolved and in which the catalyst is in suspension.

2. A process according to claim 1, wherein the polymerization consists of a homopolymerization of a monomer chosen among the following compounds, namely, 1-3 butadiene and isoprene.

3. A process according to claim 1, wherein the polymerization consists in a copolymerization of a diene monomer, for example, isoprene, with a copolymerizable comonomer with the aforementioned monomer, in particular an α-olefine, for example, styrene.

4. The process according to claim 1 wherein the solvent is a saturated aliphatic solvent with a straight or branched chain.

5. The process according to claim 1 wherein the solvent is a saturated alicyclic solvent.

* * * * *